United States Patent
Ke

(10) Patent No.: US 7,321,523 B2
(45) Date of Patent: Jan. 22, 2008

(54) SYSTEM FOR MONITORING PROCESSING DEVICE UTILIZATION IN A COMPUTER

(75) Inventor: Jia-Min Ke, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 246 days.

(21) Appl. No.: 10/905,363

(22) Filed: Dec. 30, 2004

(65) Prior Publication Data

US 2006/0179379 A1    Aug. 10, 2006

(51) Int. Cl.
*G11C 5/14*    (2006.01)
(52) U.S. Cl. ............... 365/226; 323/224; 323/282; 323/284
(58) Field of Classification Search ......... 365/226; 323/224, 284, 285, 266, 282
See application file for complete search history.

(56) References Cited

U.S. PATENT DOCUMENTS

| | | | | |
|---|---|---|---|---|
| 6,229,292 B1* | 5/2001 | Redl et al. | ............... | 323/285 |
| 6,396,252 B1* | 5/2002 | Culpepper et al. | .......... | 323/285 |
| 6,600,298 B2* | 7/2003 | McDonald et al. | ......... | 323/271 |
| 7,078,882 B2* | 7/2006 | Weng et al. | ................ | 323/224 |
| 2003/0185028 A1* | 10/2003 | Horimoto | .................... | 363/97 |

* cited by examiner

*Primary Examiner*—Richard T. Elms
*Assistant Examiner*—Toan Le
(74) *Attorney, Agent, or Firm*—Birch, Stewart, Kolasch & Birch, LLP

(57) ABSTRACT

A monitoring system capable of monitoring utilization of a processing device in a computer. The monitoring system includes a power supply voltage for supplying a core voltage to the processing device, and a comparator for comparing a voltage proportional to the core voltage to a reference voltage and producing a sense voltage. The resulting sense voltage is used to control a processing device management process, or alternatively may be used to control a variety of other processes including cooling fan operation.

15 Claims, 3 Drawing Sheets

SYSTEM FOR MONITORING PROCESSING DEVICE UTILIZATION IN A COMPUTER

BACKGROUND OF THE INVENTION

1. Field of the Invention

The device and method of the present invention relates to monitoring of the utilization of a processing device in a computer, more particularly to the instant monitoring of the utilization of a processing device via a power supply without additionally burdening the processing device itself.

2. Description of the Prior Art

Many commonly available general computing devices, such as desktop PCs, notebook PCs etc., incorporate several processing devices. Broadly, these can be grouped as processing devices with specific tasks, such as video and input/output (IO) processors, and the Central Processing Unit (CPU), which undertakes general computing tasks. Management of, for example, the CPU, or even multiple processors where applicable, is an important task. Utilization, i.e. how hard the CPU or other processing device is working at any one time, is a key measurable that may be used to initiate, for example, load shedding or cooling devices. That is, if a CPU is nearing maximum capacity or a significant load level, an operating system or supervisory mechanism may be required to rationalize CPU usage by suspending less important applications in order to execute more important applications more efficiently. And, because the CPU creates (and therefore must dissipate) increasing amounts of heat in proportion to increasing utilization, the speed function of the CPU cooling fan may also be slaved to this parameter.

Prior art devices and methods for realizing the monitoring of processing device utilization, exist in both the software and hardware realms. Software methods implemented in operating systems, or utilities used by operating systems to poll CPU utilization, are themselves applications and so have the disadvantage of additionally burdening the CPU in order to measure activity levels. As mentioned above, the CPU creates increasing amounts of heat in proportion to increasing utilization, so temperature in and around the CPU can be used as an indicator. Hardware implementations often utilize transducers such as thermal diodes, thermistors, thermocouples etc., however, while such means place no additional burden on the CPU, they do not return a level of accuracy comparable with software methodology.

It can be appreciated then, that a hardware implemented means of monitoring processing device utilization with an accuracy closer to that of software implemented techniques than that achieved by the abovementioned hardware arrangements, would provide designers with a valuable aid to providing optimal performance in computing devices.

SUMMARY OF INVENTION

It is a primary objective of the present invention to provide a monitoring system capable of monitoring processing device utilization in a computer. The monitoring system includes a power supply for supplying a core voltage to a processing device and a comparator for comparing a voltage proportional to the core voltage to a reference voltage and producing a sense voltage. A first input of the comparator is connected to the power supply and a second input of the comparator is connected to a reference voltage source.

The method for monitoring processing device utilization in a computer includes such steps as generating a core voltage for supply to a processing device, comparing a voltage proportional to a core voltage of the processing device to a reference voltage, generating a sense voltage according to a difference between the voltage proportional to the core voltage and the reference voltage, and utilizing the sense voltage to control a processing device management process.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION

Power supplies dedicated to processing devices are necessarily very tightly controlled in terms of stability and noise. Nevertheless, as increasing demand on a processing device relates directly to its power consumption as discussed above, the voltage on the processing device supply rail will vary, even if only slightly, with increasing (or decreasing) current draw.

Figure 1:
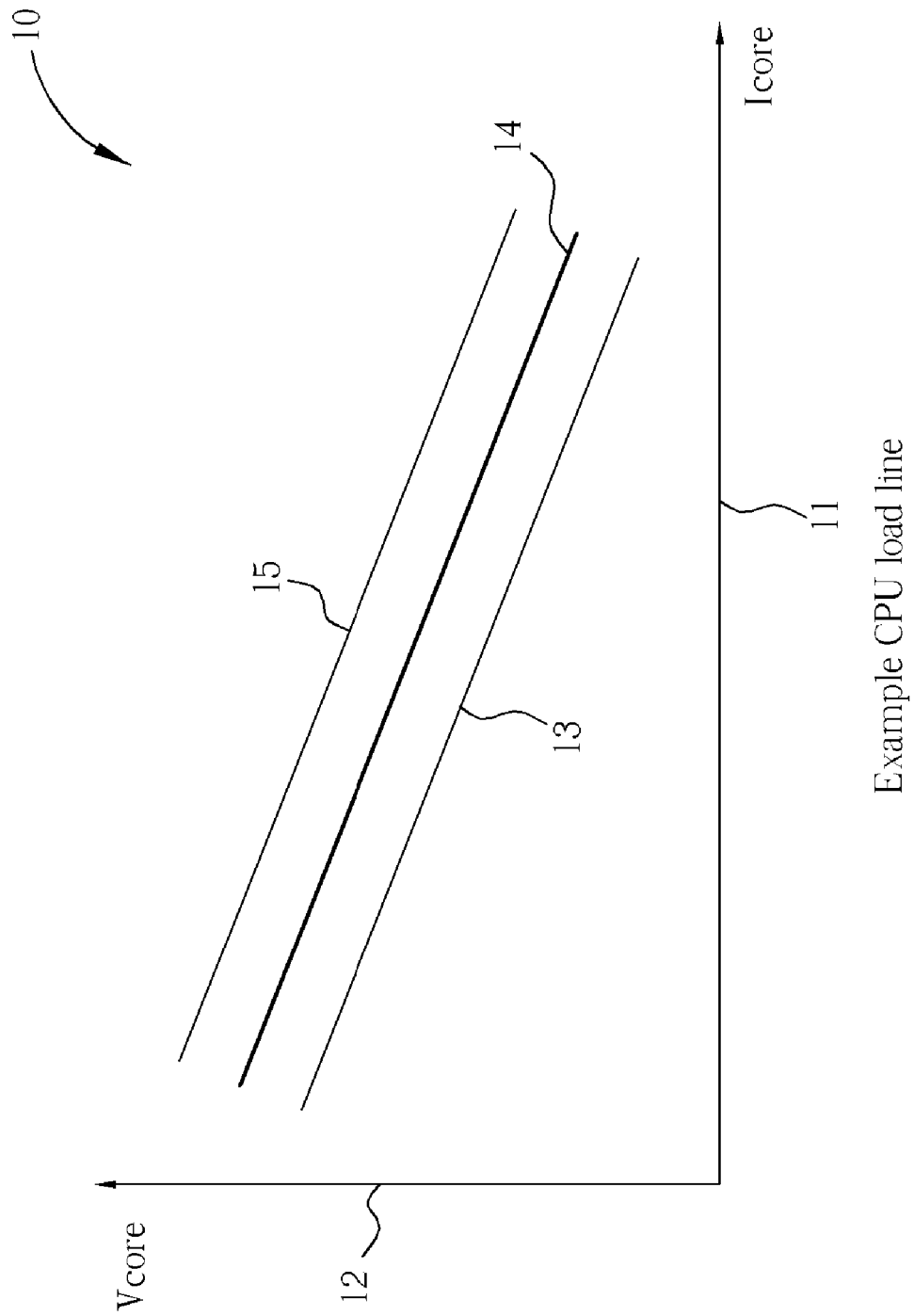
FIG. 1 shows an example CPU load line of a central processor unit (CPU).

Taking by way of example, the Central Processor Unit (CPU) of a computer, the supply rail voltage is commonly termed 'core voltage' (Vcore), and similarly, the current flowing from the supply rail is termed 'core current' (Icore). In the art of computing device design, the abovementioned fact is widely known and Icore(power consumption), with respect to CPU utilization (i.e. instantaneous percentile loading) for a given rating of power supply, is often quoted by manufacturers in CPU specifications. But current sense is not easy and expensive. Hence, the sense Vcore voltage drop is replaced for sense Icore in order to monitor CPU utilization. Please refer to FIG. 1, which shows a graphical representation of an example CPU load line 10. The graph of FIG. 1 features a horizontal axis 11 representing Icore, a vertical axis 12 representing Vcore, and a load line 14 bounded by a lower limit line 13 and an upper limit line 15. Hence, it can be appreciated that CPU utilization may be characterized by variance apparent in the core voltage supply.

Figure 2:
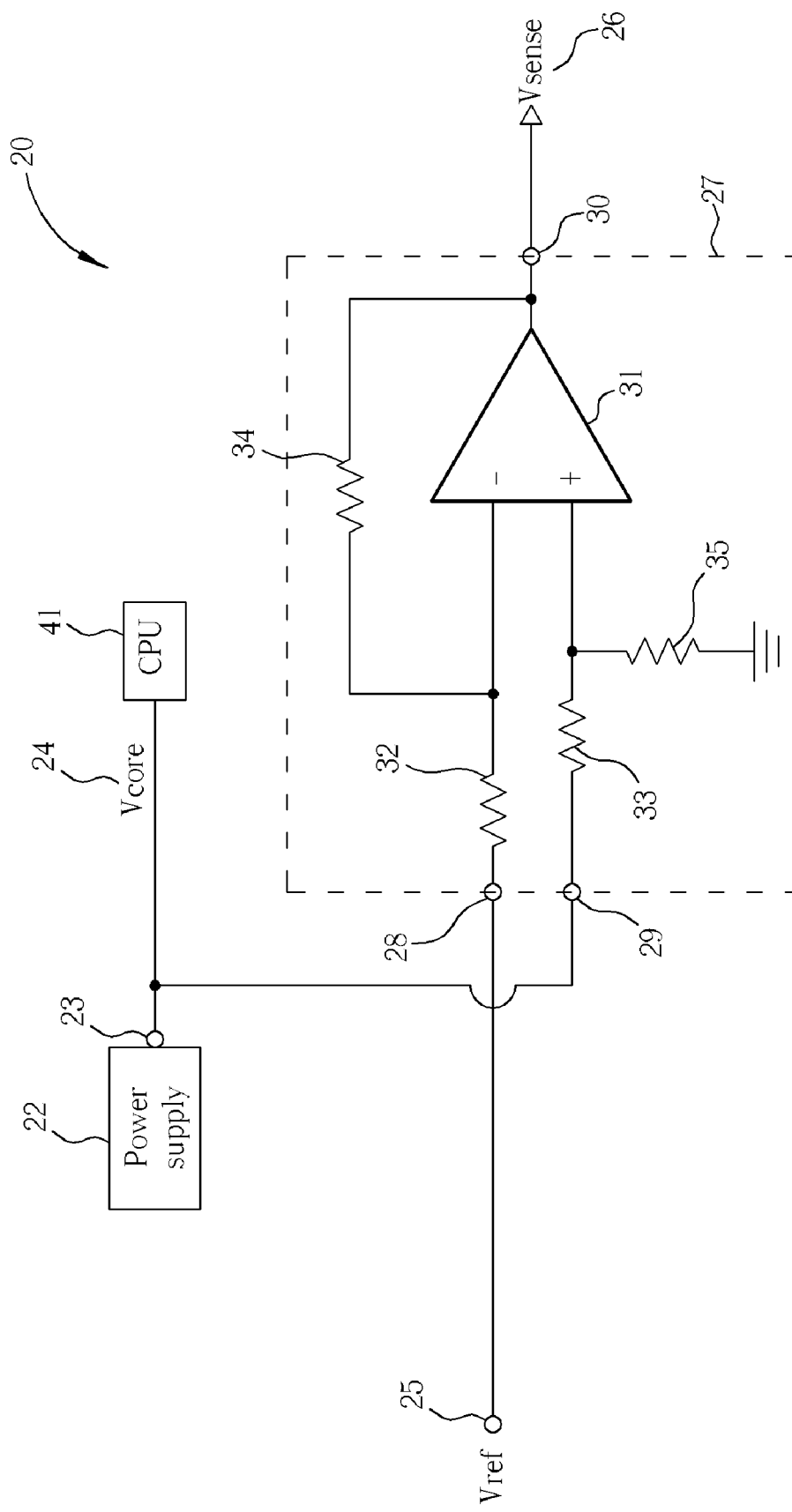
FIG. 2 shows a first embodiment of a monitoring system capable of monitoring processing device utilization in a computer according to the present invention.

The present invention takes advantage of the above fact in providing a means for monitoring CPU utilization. FIG. 2 shows a schematic diagram of a first embodiment of the present invention monitoring system 20 capable of monitoring a processing device. In the given example the processing device is a central processor unit (CPU) 41. The monitoring system monitors Vcore 24 supplied to the CPU 41 from the output port 23 of a power supply 22. The power supply output, Vcore 24, is fed to a positive input port 29 (in this case, an end of an input resistor 33) of a comparator circuit 27. A negative input port 28 (also an end of an input resistor 32) of the comparator circuit 27 is connected to a reference voltage (Vref) 25. The reference voltage source may be any suitable voltage source provided by the numerous techniques known within the art, including the use of a digital to analog converter. The reference voltage Vref 25, is set at a level corresponding to a nominal off-load voltage value for Vcore 24, given in the CPU specification. However, in alternative embodiments it may be useful to set Vref 25 to a different value, for example, a voltage value corresponding to an average value for Vcore 24 established during utilization assessment testing, hence the value given here should not be construed as limiting.

The positive input resistor 33 and the negative input resistor 32, are connected to the positive and negative inputs of an operational amplifier 31 respectively. Operational amplifiers are preferred in this role because of their high input impedance, consequently the inclusion of an operational amplifier 31 in the present invention means that the comparator circuit 27 has a negligible affect on the loading of the power supply 22 output. The operational amplifier 31 is biased into comparator configuration by a bias resistor 35, a feedback resistor 34 and the two input resistors 32 & 33 mentioned above. The operational amplifier 31 outputs a sense voltage (Vsense) 26 to an output port 30 of the comparator circuit 27, Vsense 26 being proportional to a difference between Vcore 24 and Vref 25. That is, as Vcore 24 decreases with increasing CPU 41 load (Vcore being inversely proportional to Icore), Vsense 26 will follow the same trend and become more negative because Vcore 24 is connected to the non-inverting input of the operational amplifier 31, and is diminishing with respect to Vref 25.

The gearing or amplification (A) evident in the value of Vsense, when compared to the difference in Vcore and Vref, is dictated by the relative values of the biasing resistors of the comparator, and can be expressed by the formula:

$$A = \frac{V sense}{V core - V ref}$$

and hence:

$$V sense = A(V core - V ref)$$

Figure 3:
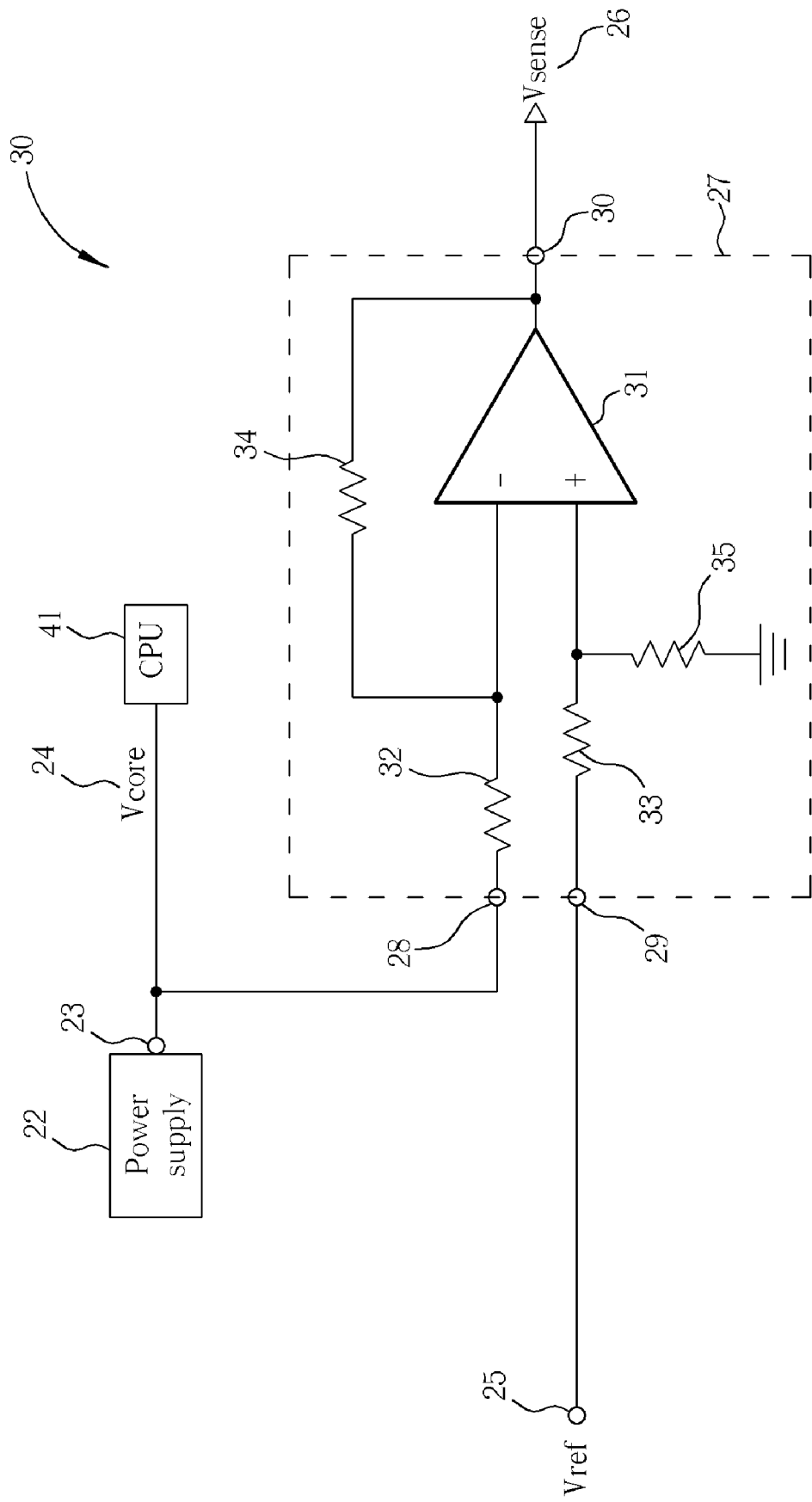
FIG. 3 shows a second embodiment of a monitoring system capable of monitoring processing device utilization in a computer according to the present invention.

A second embodiment of the present invention, shown in FIG. 3 (like elements in FIGS. 2 & 3 retain the same reference numerals), like the first embodiment, features a monitoring system 30 capable of monitoring a CPU 41. However, in the second embodiment, Vcore 24 and Vref 25 are connected to the comparator circuit 27 in the opposite sense, i.e. Vcore 24 is connected to the negative input port 28 and Vref 25 is connect to the positive input port 29. Effectively, Vcore is connected to the inverting input of the operational amplifier 31, hence as Vcore decreases with increasing CPU 41 load, Vsense 26 will become more positive, i.e. increase.

Vsense 26, may be used, for example, to drive a cooling fan control circuit for additional cooling of the CPU during periods of high utilization. It may also be conditioned and fed to the CPU as a data input for self-management purposes, or alternatively to a CPU supervisor device for third party execution of similar functions. As a further alternative, Vsense 26 may be used to generate interrupt signals at various predetermined levels of utilization, the interrupts being sent to the CPU (or supervisor device) to warn of increasing/decreasing utilization, thus saving the overhead required for the CPU to constantly poll utilization parameters internally.

The present invention offers greater accuracy than prior art techniques based upon heat measurement, while removing the burden placed on the CPU by software based methods of CPU utilization measurement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A monitoring system capable of monitoring a central processor unit utilization in a computer, the system comprising:
   a power supply for supplying a core voltage to the central processor unit; and
   a comparing circuit for comparing a voltage proportional to the core voltage to a reference voltage and producing a sense voltage, a first input of the comparing circuit connecting to the power supply and a second input of the comparing circuit connecting to a reference voltage source that outputs the reference voltage, wherein the reference voltage is set at a level corresponding to a nominal off-load voltage value for the core voltage.

2. The monitoring system of claim 1, wherein the first input of the comparing circuit is a non-inverting input and the second input of the comparing circuit is an inverting input.

3. The monitoring system of claim 1, wherein the first input of the comparing circuit is an inverting input and the second input of the comparing circuit is a non-inverting input.

4. The monitoring system of claim 1, wherein the power supply has an output for outputting the core voltage, the comparing circuit having a first input coupled to the output of the power supply for inputting the core voltage and a second input for inputting the reference voltage.

5. The monitoring system of claim 1, wherein the comparing circuit comprises an operational amplifier.

6. The monitoring system of claim 1 further comprising a digital-to-analog converter for generating the reference voltage input to the comparing circuit.

7. A method for monitoring processing device utilization in a computer, the method comprising the following steps:
   generating a core voltage for supply to a central processor unit;
   comparing a voltage proportional to a core voltage of the processing device to a reference voltage, wherein the reference voltage is set at a level corresponding to a nominal off-load voltage value for the core voltage;
   generating a sense voltage according to a difference between the voltage proportional to the core voltage and the reference voltage; and
   utilizing the sense voltage to control a central processor unit management process.

8. The method of claim 7, wherein generating a core voltage for supply to a central processor unit comprises outputting the core voltage from a power supply.

9. The method of claim 7, wherein comparing a voltage proportional to a core voltage of the central processor unit to a reference voltage comprises comparing the core voltage to the reference voltage.

10. The method of claim 7, wherein comparing a voltage proportional to a core voltage of the processing device to a reference voltage comprises inputting the voltage proportional to the core voltage of the processing device to an inverting input of a comparing circuit and comparing the voltage proportional to a core voltage of the processing device to a reference voltage.

11. The method of claim 10, wherein generating a sense voltage comprises generating a sense voltage that is inversely proportional to the core voltage.

12. The method of claim 7, wherein comparing a voltage proportional to a core voltage of the processing device to a reference voltage comprises inputting the voltage proportional to the core voltage of the processing device to a non-inverting input of a comparing circuit and comparing the voltage proportional to a core voltage of the processing device to a reference voltage.

13. The method of claim 12, wherein generating a sense voltage comprises generating a sense voltage that is proportional to the core voltage.

14. The method of claim 7, further comprising generating the reference voltage according to a nominal off-load core voltage of the processing device.

15. The method of claim 14, further comprising utilizing a digital to analog converter to generate the reference voltage.

* * * * *